United States Patent
Uemura (10) Patent No.: US 12,099,756 B2
(45) Date of Patent: Sep. 24, 2024

(54) IMAGE FORMING SYSTEM AND DATA MANAGEMENT METHOD

(71) Applicant: SHARP KABUSHIKI KAISHA, Sakai (JP)

(72) Inventor: Atsushi Uemura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/974,523

(22) Filed: Oct. 27, 2022

(65) Prior Publication Data

US 2023/0176792 A1 Jun. 8, 2023

(30) Foreign Application Priority Data

Dec. 2, 2021 (JP) .................. 2021-196478

(51) Int. Cl.
*G06F 3/12* (2006.01)
(52) U.S. Cl.
CPC .......... *G06F 3/1204* (2013.01); *G06F 3/1255* (2013.01); *G06F 3/1257* (2013.01); *G06F 3/126* (2013.01); *G06F 3/12* (2013.01)
(58) Field of Classification Search
CPC .... G06F 3/1204; G06F 3/1255; G06F 3/1257; G06F 3/126

USPC .......................................... 358/1.15
See application file for complete search history.

(56) References Cited

U.S. PATENT DOCUMENTS

| | | | |
|---|---|---|---|
| 2006/0221372 A1* | 10/2006 | Onishi | G06F 3/1296 358/1.13 |
| 2010/0036967 A1* | 2/2010 | Caine | H04N 21/47205 709/236 |
| 2012/0086975 A1 | 4/2012 | Ozaki | |
| 2018/0359379 A1* | 12/2018 | Igawa | G06F 3/1231 |
| 2020/0314287 A1* | 10/2020 | Kawamura | H04N 1/444 |
| 2022/0075845 A1* | 3/2022 | Bowen | G06F 30/30 |

FOREIGN PATENT DOCUMENTS

JP 2012099087 A 5/2012

* cited by examiner

*Primary Examiner* — Darryl V Dottin
(74) *Attorney, Agent, or Firm* — ScienBiziP, P.C.

(57) ABSTRACT

An image forming system includes an image forming apparatus and a server connected via a network. Functions in image formation in the image forming apparatus are registered as favorite settings, and when the favorite setting is shared by the image forming apparatus and the server, only a specific function in the favorite setting is made a target to be shared.

13 Claims, 7 Drawing Sheets

IMAGE FORMING SYSTEM AND DATA MANAGEMENT METHOD

BACKGROUND OF THE INVENTION

Field of the Invention

This disclosure relates to an image forming system including an image forming apparatus and a server connected via a network, and a data management method thereof.

Description of the Background Art

In recent years, printer drivers have been used in image forming apparatuses as software for executing print processing. In information processors, various functions such as specification of paper size, type, and color, post-processing of paper and the like can be set by mounting printer drivers. In the printer driver, various functions related to the print processing can be grouped together and registered as favorite setting. A method of publishing this favorite setting so as to be used by a plurality of users is provided.

The information processor described in the above background art includes a controller which enables setting of a plurality of pieces of print setting information and limits use of selected print setting information and a controller which controls so as to allow use of batch setting information (favorite setting) not including the print setting information whose use is limited and not to allow use of batch setting information including the print setting information whose use is limited, and the batch setting information is constituted by a plurality of pieces of the print setting information.

However, the information processors described above can set only allowance or disallowance of the use of batch setting information, which is inconvenient in providing the batch setting information.

This disclosure was made in order to solve the above problem and has an object to provide an image forming system that extracts only necessary setting from the favorite settings and a data management method.

SUMMARY OF THE INVENTION

The image forming system according to the present disclosure is an image forming system including an image forming apparatus and a server connected via a network, and is characterized in that functions in image formation in the image forming apparatus are registered as favorite settings, and when the favorite settings are shared by the image forming apparatus and the server, only a specific function in the favorite settings is made a target to be shared.

The image forming system according to the present disclosure is an image forming system including an image forming apparatus, an information processor, and a server connected via a network, characterized in that the image forming apparatus forms an image in response to an instruction from the information processor, and functions in image formation in the image forming apparatus are registered as favorite settings, and when the favorite settings are shared by the image forming apparatus and the server, only a specific function in the favorite settings is made a target to be shared.

The image forming system according to the present disclosure may be configured to combine a plurality of the favorite settings and to aggregate them into one of the favorite settings.

The image forming system according to the present disclosure may be configured to determine names for the favorite settings and store the names with identifying words.

The image forming system according to the present disclosure may be configured not to present a favorite setting which includes a function unavailable in the image forming apparatus in the favorite settings having been stored.

The image forming system according to the present disclosure may be configured to disable and present a function unavailable in the image forming apparatus when presenting the favorite settings having been stored.

The image forming system according to the present disclosure may be configured such that the specific function to be shared in the favorite settings is specified by a user.

The image forming system according to the present disclosure may be configured such that the specific function to be shared in the favorite settings is specified by the image forming apparatus or the server.

The data management method according to the present disclosure is a data management method of an image forming system including an image forming apparatus and a server connected via a network and is characterized in that functions in image formation in the image forming apparatus are registered as favorite settings, and when the favorite settings are shared by the image forming apparatus and the server, only a specific function in the favorite settings is made a target to be shared.

According to this disclosure, by registering the settings that users frequently use as the favorite settings and sharing only the specific functions, only necessary setting can be extracted, whereby highly usable sharing can be performed.

DESCRIPTION OF THE PREFERRED EMBODIMENTS

In the following, an image forming system according to an embodiment of the present disclosure will be described with reference to the drawings.

Figure 1:
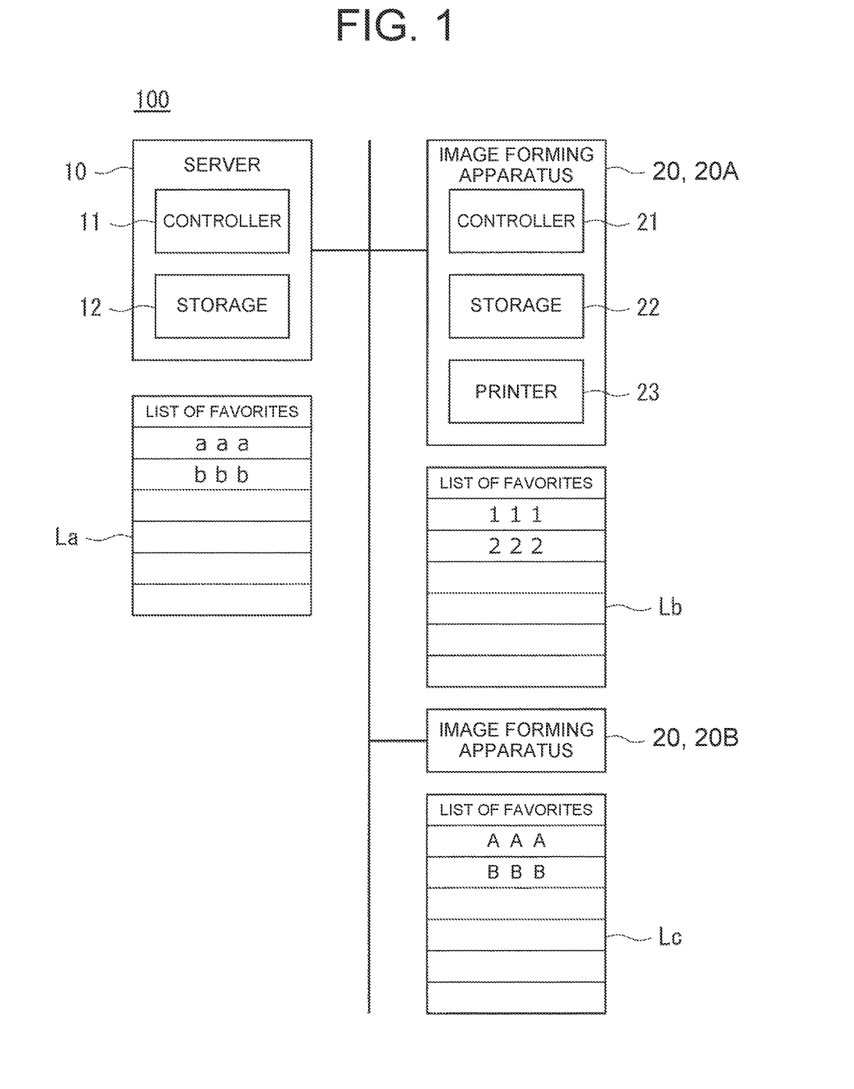
FIG. 1 is a schematic configuration diagram illustrating an image forming system according to an embodiment of the present disclosure.

FIG. 1 is a schematic configuration diagram illustrating an image forming system according to the embodiment of the present disclosure.

The image forming system 100 according to the embodiment of the present disclosure includes an image forming apparatus 20 and a server 10 connected via a network. Although FIG. 1 shows a configuration with two image forming apparatuses 20 connected to the network, this is not limiting, and three or more image forming apparatuses 20 may also be included in the configuration. For the sake of explanation in the following, one of the two image forming apparatuses 20 will be referred to as a first image forming apparatus 20A (equivalent to a client A, described below) and the other as the second image forming apparatus 20B (equivalent to a client B, described below) in some cases.

The image forming apparatus 20 is an apparatus which performs copying, facsimile, and image forming (printing), for example, and has a controller 21, a storage 22, and a printer 23. In FIG. 1, the configuration of the second image forming apparatus 20B is omitted, but it is supposed to have substantially the same configuration as that of the first image forming apparatus 20A. The image forming apparatus 20 may further include a display which displays setting related to image formation and the like and an input acceptor which accepts an input from the user and the like.

The server 10 includes a controller 11 and a storage 12, stores various types of information transmitted from the image forming apparatus 20 and transmits the various types of information to the image forming apparatus 20.

In the image forming system 100, functions in image formation in the image forming apparatus 20 can be registered as a favorite setting. A printer driver is stored in the server 10 and the image forming apparatus 20, and the printer driver refers to the favorite setting and assists the image formation in the image forming system 100. In FIG. 1, lists of the favorite settings stored in the server 10, the first image forming apparatus 20A, and the second image forming apparatus 20B are illustrated, respectively. In a plurality of favorite settings, names are given to distinguish them from one another, and the list of favorite settings shown in FIG. 1 describes the corresponding names.

In FIG. 1, the list of favorite settings stored in the server 10 (server list La) stores the favorite settings with the names of "aaa" and "bbb", the list of favorite settings (first image formation list Lb) stored in the first image forming apparatus 20A stores the favorite settings with the names of "111" and "222", and the list of favorite settings (second image formation list Lc) stored in the second image forming apparatus 20B stores the favorite settings with the names of "AAA" and "BBB".

Figure 2:
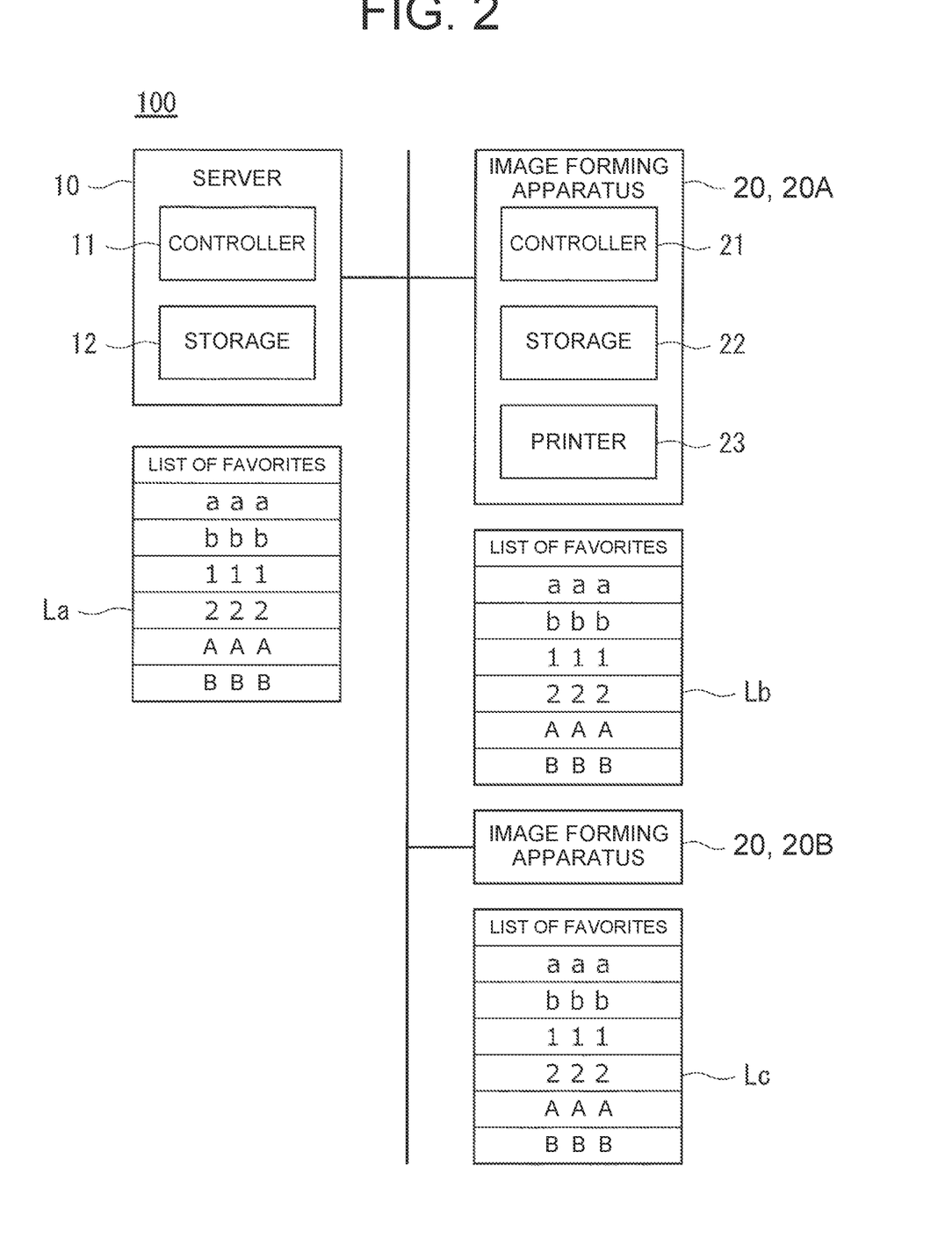
FIG. 2 is a schematic configuration diagram illustrating a state where the favorite setting is shared in the image forming system.

FIG. 2 is a schematic configuration diagram illustrating a state where the favorite settings are shared in the image forming system.

In the image forming system 100, the favorite settings are shared by the image forming apparatus 20 and the server 10. FIG. 2 illustrates a state after the favorite settings are shared by the image forming apparatus 20 and the server 10 from the state shown in FIG. 1.

In FIG. 2, all the server list La, the first image formation list Lb, and the second image formation list Lc store the favorite settings with the names of "aaa", "bbb", "111", "222", "AAA", and "BBB". In other words, as the result of sharing the favorite settings, the favorite settings stored in each of terminals (the server 10, the first image forming apparatus 20A, and the second image forming apparatus 20B, for example) are also stored in the other terminals.

The timing for sharing the favorite setting may be set as appropriate and may be set when registering a new favorite setting or during communication between the server 10 and the image forming apparatus 20, for example. Specifically, when the server 10 and the first image forming apparatus 20A communicate with each other, among the favorite settings stored in the first image forming apparatus 20A, the favorite setting not stored in the server 10 is stored in the server 10, and among the favorite settings stored in the server 10, the favorite setting not stored in the first image forming apparatus 20A is stored in the first image forming apparatus 20A.

In the image forming system 100, when the favorite setting is shared, only a specific function in the favorite setting is made a target to be shared. Therefore, by referring to FIG. 3, the functions of the shared favorite settings will be described.

Figure 3:
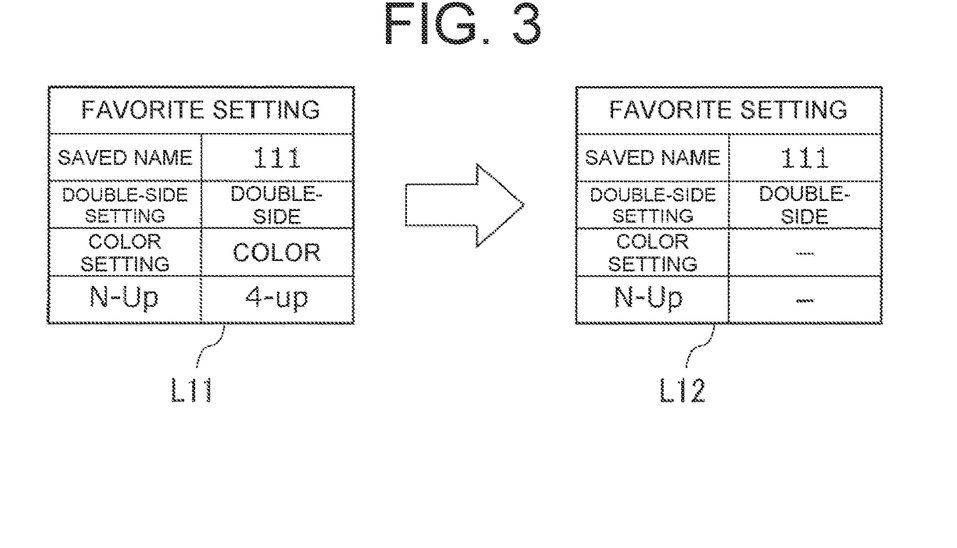
FIG. 3 is an explanatory diagram illustrating an example of the favorite setting which shares a specific function.

FIG. 3 is an explanatory diagram illustrating an example of the favorite settings that share specific functions.

In FIG. 3, the shared source setting L11, which shows the functions set in the source favorite setting to be shared, and the shared destination setting L12, which shows the functions set in the destination favorite setting to be shared are illustrated.

The "Saved Name" indicating a name given to the shared source setting L11 and the shared destination setting L12 are set to "111" and the set functions are "Double-side Setting" indicating whether to print on both sides of the paper or not, "Color Setting" indicating whether to print in color or not, and "N-Up" indicating whether to print a plurality of manuscripts on one page. FIG. 3 shows an example of the functions that can be set in the favorite settings, and other functions may also be set.

In the shared source setting L11 and the shared destination setting L12, the "Double-side Setting" is set to "Double-side", and the shared source setting L11 and the shared destination setting L12 have the same setting. For the "Color Setting," it is set to "Color" in the shared source setting L11 and to "—(invalid)" in the shared destination setting L12. For the "N-Up", it is set to "4 Up" in the shared source setting L11 and to "—(invalid)" in the shared destination setting L12. The functions that are disabled in the favorite settings are simply not specified in advance and can be specified again by the user at the time of printing.

In other words, in the example shown in FIG. 3, when the shared source setting L11 is to be shared, only the "Double-side Setting" is specified and shared, and the "Color Setting" and "N-Up" are excluded from sharing and are disabled. The specific functions to be shared in the favorite settings may be specified by the user or may be specified by the image forming apparatus or the server.

Thus, by registering the settings that users frequently use as the favorite settings and sharing only the specific functions, only necessary settings can be extracted, whereby highly usable sharing can be performed.

In the image forming system 100, when the favorite setting is shared, a plurality of the favorite settings are aggregated into a single favorite setting. Therefore, by referring to FIG. 4, the aggregation of the favorite settings will be described.

Figure 4:
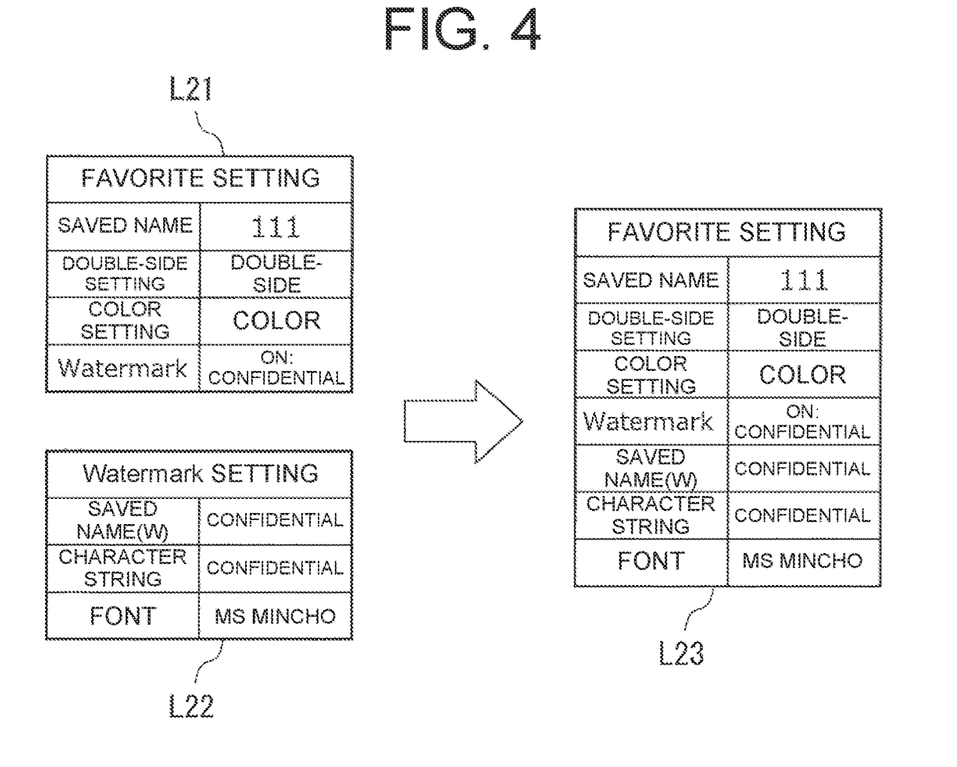
FIG. 4 is an explanatory diagram illustrating an example of aggregation of the favorite settings.

FIG. 4 is an explanatory diagram illustrating an example of aggregation of the favorite settings.

In FIG. 4, a first aggregation source setting L21 and a second aggregation source setting L22, which indicate the functions set in aggregation source favorite settings, and an aggregation destination setting L23, which indicates the functions set in an aggregation destination favorite settings are shown. In other words, the two files, that is, the first aggregation source setting L21 and the second aggregation source setting L22 separately managed are aggregated into one file, that is, the aggregation destination setting L23 and is managed by the image forming apparatus 20 or the server 10. As described above, the dispersed favorite settings can be managed easily by combining them into one.

In the first aggregation source setting L21, the "Saved Name" is set to "111" and the set functions are "Double-side Setting", "Color Setting", and "Watermark", which indicates whether or not to print a watermark. In the "Watermark" in the first aggregation source setting L21, the watermark print is set to be performed with reference to the second aggregation source setting L22. In the second aggregation source setting L22, the "Character String" indicating the contents to be printed and the "Font" to be used for the characters are set.

In the aggregation destination setting L23, the "Saved Name" is set to "111", which is the same as that of the first aggregation source setting L21, and the set functions are "Double-side Setting", "Color Setting", "Watermark", "Character String", and "Font". In the aggregation destination setting L23, the "Saved Name (W)" corresponding to the second aggregation source setting L22 is also managed.

In the image forming system 100, duplication of names is avoided when sharing the favorite setting is shared. Therefore, by referring to FIG. 5, a change of the name of the shared favorite setting will be described.

Figure 5:
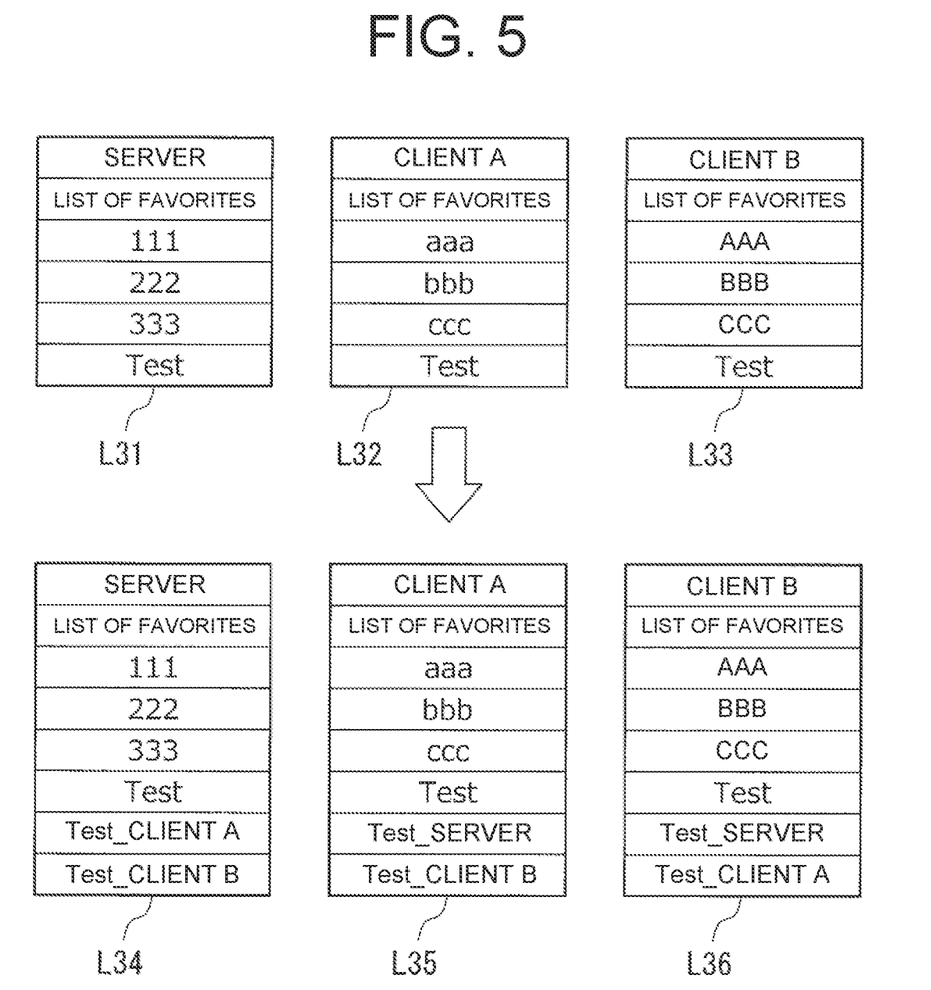
FIG. 5 is an explanatory diagram illustrating an example of the favorite setting which has been renamed and shared.

FIG. 5 is an explanatory diagram illustrating an example of the favorite setting whose name was changed and shared.

In FIG. 5, the lists of favorite settings stored in the server 10, the first image forming apparatus 20A, and the second image forming apparatus 20B before and after the sharing are shown.

In FIG. 5, the list of favorite settings stored in the server 10 (the server list L31 before change) stores the favorite settings with the names of "111", "222", "333", and "Test", the list of the favorite settings (first image formation list L32 before change) stored in the first image forming apparatus 20A (client A) stores the favorite settings with the names of "aaa", "bbb", "ccc", and "Test", and the list of the favorite settings (second image formation list L33 before change) stored in the second image forming apparatus 20B (client B) stores the favorite settings with the names of "AAA", "BBB", "CCC", and "Test". In other words, the server list L31 before change, the first image formation list L32 before change, and the second image formation list L33 before change store the same favorite setting with the name of "Test".

If the favorite setting is shared in this state, the "Test" is duplicated. Therefore, in the image forming system 100, the duplication of the name is avoided by giving an identifying word to the name corresponding to the favorite setting. Specifically, the "Test" stored in the server 10 is given the identifying word so as to have "Test_Server", and it is stored in the first image forming apparatus 20A and the second image forming apparatus 20B. In addition, the "Test" stored in the first image forming apparatus 20A is given an identifying word so as to have "Test_Client A", and it is stored in the server 10 and the second image forming apparatus 20B. Furthermore, the "Test" stored in the second image forming apparatus 20B is given an identifying word so as to have "Test_Client B", and it is stored in the server 10 and the first image forming apparatus 20A.

As a result, "Test_Client A" and "Test_Client B" are added to a server list L34 after change shown in FIG. 5, "Test_Server" and "Test_Client B" are added to a first Image formation list L35 after change, and "Test_Server" and "Test_Client A" are added to a second image formation list L36 after change. In the example described above, "_Server" or the like is assigned as a suffix, but it is not limiting, and a unique name, ID, or prefix may also be given.

Subsequently, a response when a function that has been determined to be unavailable is included in the favorite setting in the image forming apparatus 20 will be explained with reference to FIGS. 6 and 7.

Figure 6:
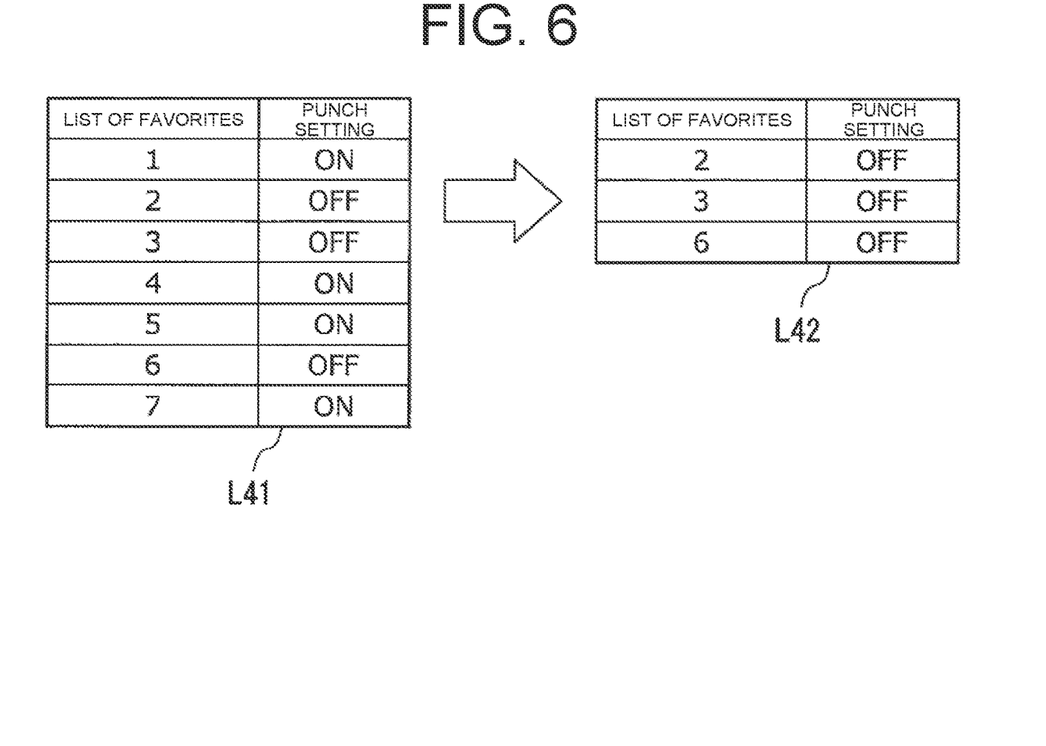
FIG. 6 is an explanatory diagram illustrating an example of the favorite setting (No. 1) which includes a function that has been determined to be unavailable.

FIG. 6 is an explanatory diagram illustrating an example (Part 1) of the favorite settings that include a function that has been determined to be unavailable.

In the image forming system 100, the favorite settings that include the functions determined to be unavailable in the image forming apparatus 20 in the favorite settings having been stored are edited so as not to be presented. In FIG. 6, the list of favorite settings before editing (first list L41 before editing) and the list of favorite settings after editing (second list L42 after editing) are shown. Moreover, in FIG. 6, in the favorite settings stored in the first list L41 before editing and the first list L42 after editing, a relationship between corresponding numbers and presence or absence of a punch setting is extracted and shown. In FIG. 6, the punch function on whether punch holes are to be made in paper or not, is cited as a function that is unavailable in the image forming apparatus 20, but it is not limiting, and it may be paper binding, paper folding, or paper insertion.

In the favorite settings stored in the first list L41 before editing, "1", "4", "5", and 7" have "Punch Setting" set to "ON (Yes)", and "2", "3", and "6" "Punch Setting" set to "OFF (No). The first list L42 after editing contains only "2", "3", and "6" with the "Punch Setting" set to "OFF (No)". In other words, the favorite settings for the image forming apparatus 20 with the punch function determined to be unavailable were edited so that the favorite settings with the "Punch Setting" set to "ON (Yes)" are not presented.

In the case shown in FIG. 6, the favorite settings in which the unavailable functions are enabled are omitted, but this is not limiting, and the unavailable functions may be disabled and presented.

Figure 7:
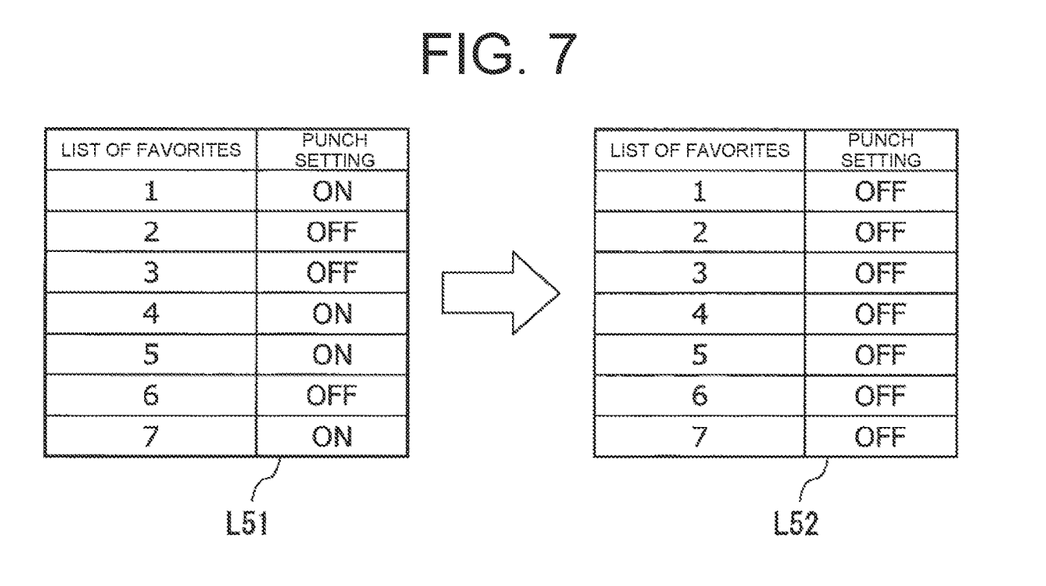
FIG. 7 is an explanatory diagram illustrating an example of the favorite setting (No. 2) that includes a function that has been determined to be unavailable.

FIG. 7 is an explanatory diagram illustrating an example (Part 2) of the favorite settings that include a function that has been determined to be unavailable.

In FIG. 7, similarly to FIG. 6, a list of favorite settings before editing (second list L51 before editing) and a list of favorite settings after editing (second list L52 after editing) are shown. The second list L51 before editing is the same as the first list L41 before editing and thus, explanation is omitted. In the second list L52 after editing, the "Punch Setting" is set to "OFF (No)" for all the favorite settings from "1" through "7". In other words, the favorite settings for the image forming apparatus 20 with the punch function determined to be unavailable were edited so that the favorite setting with the "Punch Setting" set to "ON (Yes)" are presented with the favorite setting disabled (OFF).

With the paper insertion function, a sheet different from the other pages is inserted on a specific page and printed. In order to deal with this, it is only necessary that the favorite setting that uses the paper accommodated in the image forming apparatus 20 is omitted or disabled.

Subsequently, the case in which a plurality of the image forming apparatuses 20 are connected in the image forming system 100 and the functions made available in each of them are different will be described with reference to FIG. 8.

Figure 8:
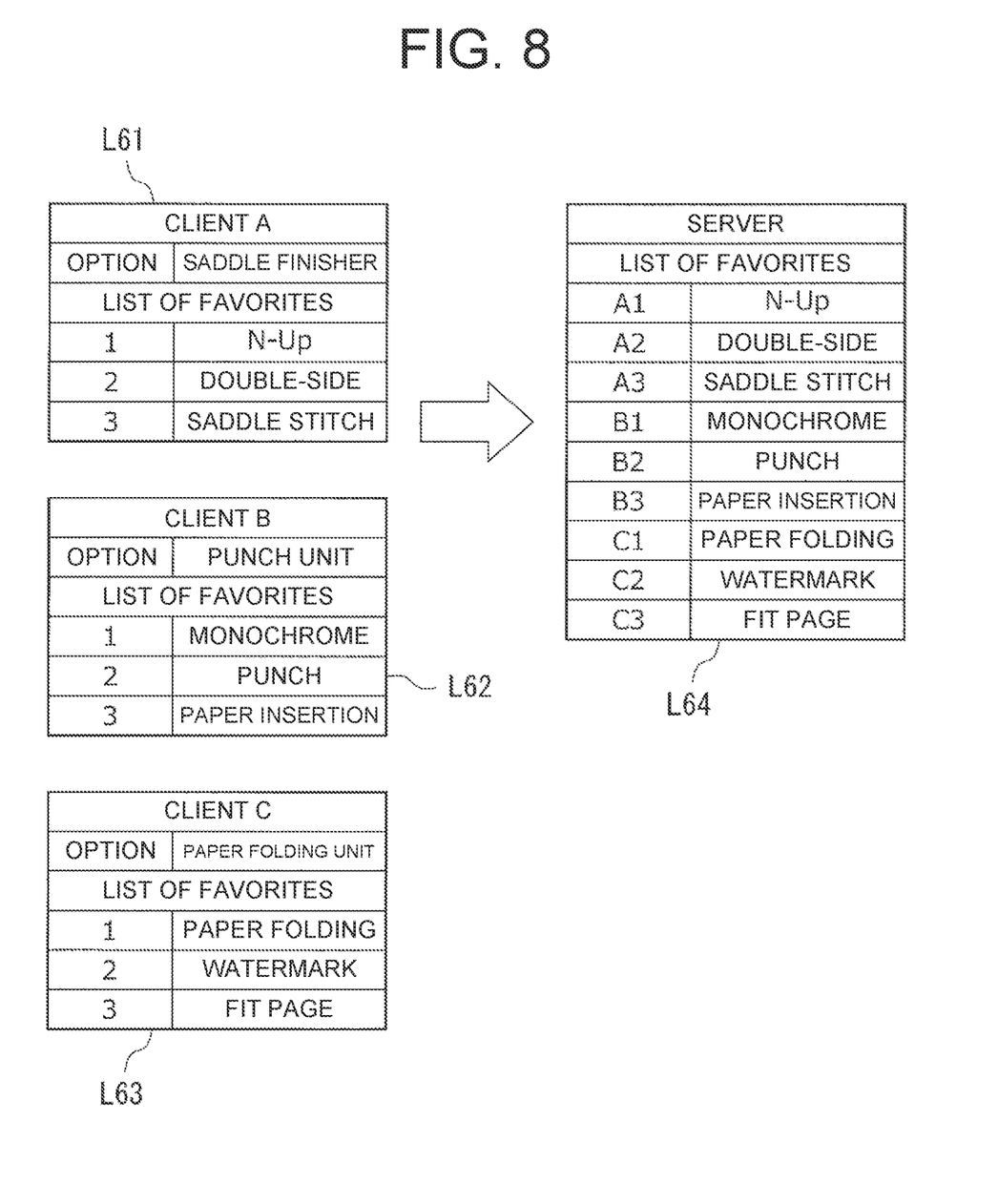
FIG. 8 is an explanatory diagram illustrating an example of aggregation of the favorite settings corresponding to a plurality of the image forming apparatuses.

FIG. 8 is an explanatory diagram illustrating an example of aggregating the favorite settings corresponding to the plurality of image forming apparatuses.

In FIG. 8, the favorite settings in the image forming system 100 in which three units of the image forming apparatuses 20 (a first image forming apparatus, a second image forming apparatus, and a third image forming apparatus) are connected are shown as an example, and a list of the favorite settings stored in the first image forming apparatus (first list L61 before aggregation), a list of the favorite settings stored in the second image forming apparatus (second list L62 before aggregation), a list of the favorite settings stored in the third image forming apparatus (third list L63 before aggregation), and a list of the favorite settings stored in the server (list L64 after aggregation) are shown.

The first image forming apparatus includes a saddle finisher that performs paper binding as an option, and in the favorite settings in the first list L61 before aggregation, "N-Up", "Double Side", "Saddle-Stitch" and the like are set. The second image forming apparatus includes a punch unit that performs punching as an option, and in the favorite settings in the second list L62 before aggregation, "Monochrome", "Punch", "Paper Insertion" and the like are set. The third image forming apparatus includes a paper folding unit that performs paper folding as an option, and in the favorite settings in the third list L63 before aggregation, "Paper Folding", "Watermark", "Fit Page" and the like are set.

Specifically, the first list L61 before aggregation, the second list L62 before aggregation, and the third list L63 before aggregation include three favorite settings, respectively. The list L64 after aggregation aggregates the first list L61 before aggregation, the second list L62 before aggregation, and the third list L63 before aggregation, and includes nine favorite settings. When the list L64 after aggregation is presented to the image forming apparatus, it is only necessary to present the favorite setting to which the unavailable function is set.

Figure 9:
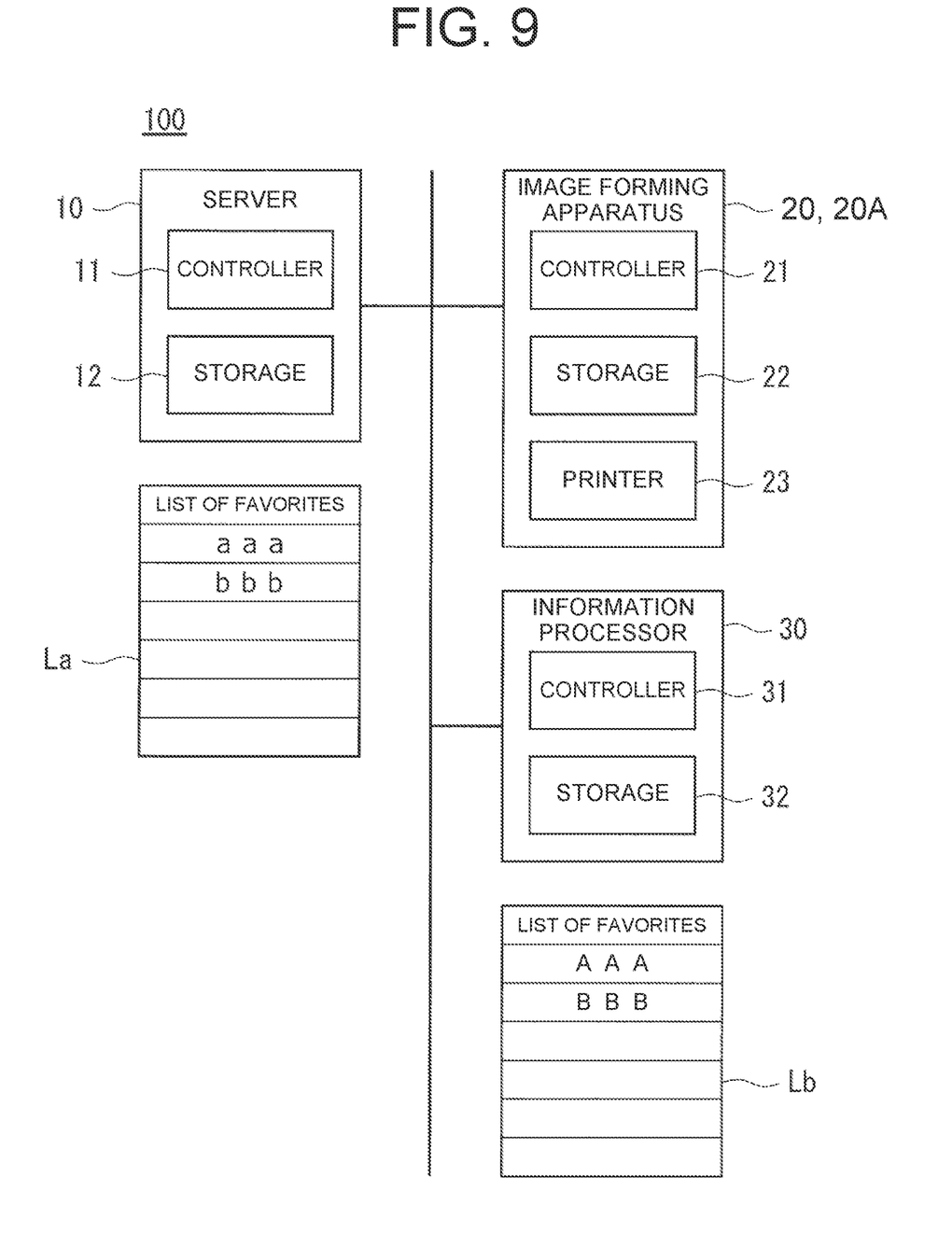
FIG. 9 is a schematic configuration diagram illustrating an image forming system according to a variation.

In the aforementioned image forming system 100, the configuration including the image forming apparatus 20 and the server 10 was described, but it is not limiting, and as a variation shown in FIG. 9, a terminal such as a PC and a mobile terminal (information processor 30) may be connected to the network, these terminals may instruct the image forming apparatus 20 to perform image formation via the server 10, and the favorite settings may be stored in the terminals.

FIG. 9 is a schematic configuration diagram illustrating the image forming system according to the variation.

The image forming system 100 according to the variation includes the image forming apparatus 20, the information processor 30, and the server 10 connected via a network. Although FIG. 9 shows the configuration with the image forming apparatus 20 and the information processor 30 connected to the network, this is not limiting, and two or more image forming apparatuses 20 or information processors 30 may also be included in the configuration.

The information processor 30 includes a controller 31 and a storage 32, stores various types of information transmitted from the image forming apparatus 20 and the server 10, and transmits the various types of information to the image forming apparatus 20 and the server 10. The information processor 30 may further include a display which displays settings related to image formation and an input acceptor which accepts an input from the user.

In the variation, the favorite settings are stored in the server 10 and the information processor 30, but this is not limiting, and the favorite settings may be stored also in the image forming apparatus 20.

The embodiment disclosed herein is an example in all respects and gives no grounds for limited interpretation. Therefore, a technical scope of the present disclosure is not to be interpreted solely on the basis of the embodiment described above but is demarcated on the basis of the recitals in the scope of claims. Moreover, all modifications within the meaning and the scope equivalent to the claims fall within the scope of the present disclosure.

What is claimed is:

1. An image forming system comprising:
an image forming apparatus and a server connected via a network, wherein
functions for image formation in the image forming apparatus are registered as favorite settings,
when the favorite settings are shared by the image forming apparatus and the server, only a specific function in the favorite settings is made a target to be shared,
names are determined for the favorite settings,
the names assigned with identifying words corresponding to the image forming apparatus and the server are stored, and
when the server and the image forming apparatus communicate with each other to share the target to be shared in the favorite settings, a favorite setting, among the favorite settings, that has been stored in the image forming apparatus, but has not been stored in the server, is stored in the server, and a different favorite setting, among the favorite settings, that has been stored in the server, but has not been stored in the image forming apparatus, is stored in the image forming apparatus.

2. An image forming system comprising:
an image forming apparatus, an information processor, and a server connected via a network, in which the image forming apparatus forms an image in response to an instruction from the information processor, wherein
functions for image formation in the image forming apparatus are registered as favorite settings,
when the favorite settings are shared by the image forming apparatus and the server, only a specific function in the favorite settings is made a target to be shared,
names are determined for the favorite settings,
the names assigned with identifying words corresponding to the image forming apparatus and the server are stored, and
when the server and the image forming apparatus communicate with each other to share the target to be shared in the favorite settings, a favorite setting, among the favorite settings, that has been stored in the image forming apparatus, but has not been stored in the server, is stored in the server, and a different favorite setting, among the favorite settings, that has been stored in the server, but has not been stored in the image forming apparatus, is stored in the image forming apparatus.

3. The image forming system according to claim 1, wherein
a function unavailable in the image forming apparatus is disabled and presented when the favorite settings that have been stored are presented.

4. The image forming system according to claim 1, wherein
the specific function to be shared in the favorite settings is specified by a user.

5. The image forming system according to claim 1, wherein
the specific function to be shared in the favorite settings is specified by the image forming apparatus or the server.

6. A data management method of an image forming system including an image forming apparatus and a server connected via a network, the data management method comprising:
- registering functions for image formation in the image forming apparatus as favorite settings,
- when the favorite settings are shared by the image forming apparatus and the server, causing only a specific function in the favorite settings to be a target to be shared;
- determining names for the favorite settings;
- assigning the names with identifying words corresponding to the image forming apparatus and the server; and
- storing the assigned names, wherein
- when the server and the image forming apparatus communicate with each other to share the target to be shared in the favorite settings, a favorite setting, among the favorite settings, that has been stored in the image forming apparatus, but has not been stored in the server, is stored in the server, and a different favorite setting, among the favorite settings, that has been stored in the server, but has not been stored in the image forming apparatus, is stored in the image forming apparatus.

7. The image forming system according to claim 2, wherein
- a function unavailable in the image forming apparatus is disabled and presented when the favorite settings that have been stored are presented.

8. The image forming system according to claim 2, wherein
- the specific function to be shared in the favorite settings is specified by a user.

9. The image forming system according to claim 2, wherein
- the specific function to be shared in the favorite settings is specified by the image forming apparatus or the server.

10. The image forming system according to claim 1, wherein
- a plurality of the favorite settings is combined and aggregated into one of the favorite settings.

11. The image forming system according to claim 1, wherein
- a favorite setting in the stored favorite settings, that includes a function unavailable in the image forming apparatus, is not presented.

12. The image forming system according to claim 2, wherein
- a plurality of the favorite settings is combined and aggregated into one of the favorite settings.

13. The image forming system according to claim 2, wherein
- a favorite setting in the stored favorite settings, that includes a function unavailable in the image forming apparatus, is not presented.

* * * * *